United States Patent
Park (10) Patent No.: US 9,092,231 B2
(45) Date of Patent: Jul. 28, 2015

(54) TERMINAL DEVICE AND IMAGE FORMING APPARATUS TO SOLVE PRINTING ERROR AND METHOD OF SOLVING PRINTING ERROR THEREOF

(75) Inventor: Sang-jin Park, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1332 days.

(21) Appl. No.: 12/198,430

(22) Filed: Aug. 26, 2008

(65) Prior Publication Data

US 2009/0080018 A1    Mar. 26, 2009

(30) Foreign Application Priority Data

Sep. 21, 2007  (KR) .............. 10-2007-96913

(51) Int. Cl.
*G06F 15/00*  (2006.01)
*G06K 1/00*  (2006.01)
*G06F 3/12*  (2006.01)
*G06F 9/44*  (2006.01)

(52) U.S. Cl.
CPC ............... *G06F 9/441* (2013.01); *G06F 3/121* (2013.01); *G06F 3/1206* (2013.01); *G06F 3/1225* (2013.01); *G06F 3/1234* (2013.01); *G06F 3/1279* (2013.01); *G06F 3/1284* (2013.01)

(58) Field of Classification Search
None
See application file for complete search history.

(56) References Cited

U.S. PATENT DOCUMENTS

| 6,567,175 B1 * | 5/2003 | Lee ............................. 358/1.14 |
| 8,355,144 B2 | 1/2013 | Lee et al. |
| 2002/0036784 A1 * | 3/2002 | Takagi ........................ 358/1.9 |
| 2003/0065773 A1 * | 4/2003 | Aiba et al. .................. 709/224 |
| 2003/0085940 A1 * | 5/2003 | Yamada ........................ 347/19 |
| 2003/0110413 A1 * | 6/2003 | Bernklau-Halvor ........... 714/25 |
| 2003/0184784 A1 * | 10/2003 | Ferlitsch ..................... 358/1.13 |
| 2004/0193745 A1 * | 9/2004 | Olbricht .......................... 710/8 |
| 2005/0134893 A1 * | 6/2005 | Han ............................. 358/1.14 |
| 2006/0139675 A1 * | 6/2006 | Lee et al. ..................... 358/1.13 |
| 2007/0296981 A1 * | 12/2007 | Lee et al. ...................... 358/1.1 |

FOREIGN PATENT DOCUMENTS

| KR | 100169915 | 10/1998 |
| KR | 1999-18098 | 3/1999 |
| KR | 2006-73832 | 6/2006 |
| KR | 1020060073832 | 6/2006 |

OTHER PUBLICATIONS

Korean Office Action dated Oct. 23, 2013 issued in KR Application No. 10-2007-0096913.

* cited by examiner

*Primary Examiner* — Ming Hon
(74) *Attorney, Agent, or Firm* — Staas & Halsey LLP (57) ABSTRACT

A terminal device includes an inbox driver unit to provide information of one or more printer drivers, and a controller to select from the inbox driver unit one of the one or more printer drivers that responds to an error, which occurs in an image forming apparatus due to the printer driver, based on information of a printer driver supportable by the image forming apparatus.

19 Claims, 5 Drawing Sheets

Model Name: Samsung SCX-1000
Support Emulation: PCL & PS

Used Driver: Samsung SCX-1000 PCL
Error Type: Operator-Specific Errors
Error Code: Set Clip Replace

TERMINAL DEVICE AND IMAGE FORMING APPARATUS TO SOLVE PRINTING ERROR AND METHOD OF SOLVING PRINTING ERROR THEREOF

CROSS-REFERENCE TO RELATED APPLICATIONS

This application claims priority under 35 U.S.C. §119 (a) from Korean Patent Application No. 10-2007-96913, filed on Sep. 21, 2007, in the Korean Intellectual Property Office, the disclosure of which is incorporated herein by reference in its entirety.

BACKGROUND OF THE INVENTION

1. Field of the Invention

The present general inventive concept relates to a terminal device and an image forming apparatus, and a method of solving a printing error thereof. More particularly, the present general inventive concept relates to a terminal device and an image forming apparatus which are capable of installing a new compatible driver having a different format from a previous one if a printing error occurs in the image forming apparatus, thereby solving the printing error effectively, and a method of solving a printing error thereof.

2. Description of the Related Art

In general, if various types of a printing error occur during a printing operation, most of users refer to a manual provided by a manufacturer of an image forming apparatus, FAQ on the Internet, or ask a service center a solution to fix the printing error. In particular, if there is not provided a printer driver compatible with user's image forming apparatus and thus a new printer driver has to be installed, an error message is generated and the user does one of the above-described methods.

Currently, since a printer driver is individually developed and released by a printer manufacturer, if a user purchases a printer manufactured by a specific manufacturer, the user has to install a printer driver suitable for the printer of the manufacturer in order to perform a printing operation. In most cases, a printer manufacturer uses a printer language, such as a print control language (PCL) or postscript (PS), which is agreed among manufacturers and is widely used for the compatibility with other manufacturer's printer.

However, if a printer driver error occurs in using a specific printer language or if a printer driver incompatible with a user's printer is used, a conventional printer outputs an error message such that it cannot perform a printing operation any more. In this case, a user tries a re-printing, or searches a proper printer driver and directly installs the searched printer driver, or contacts a service center of the manufacture in order to solve the printing error and to perform a normal printing operation. This causes an inconvenience to the user.

SUMMARY OF THE INVENTION

The present general inventive concept provides a terminal device and an image forming apparatus which obtains a compatible printer driver by searching an inbox driver if a printer driver error occurs, thereby solving a printing error promptly, and a method of solving a printing error thereof.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a terminal device including an inbox driver unit to provide at least one piece of information of a printer driver, and a controller to select from the inbox driver unit a printer driver that responds to an error, which occurs due to a printer driver in an image forming apparatus, based on information of the printer driver supportable by the image forming apparatus.

The terminal device may further include an installation unit to install a printer driver selected by the controller.

The terminal device may further include a display unit to display the printer driver information provided from the inbox driver unit.

The terminal device may further include a UI unit to provide a UI to question as to whether a printing operation is normally performed by the installed printer driver.

The inbox driver unit may provide the printer driver information which is classified by at least one of a manufacturer, a model name, and an emulation type.

The terminal device may further include a receiving unit to receive an error code and pre-stored internal information from the image forming apparatus, and, if an error is recognized by the error code, the controller selects a printer driver based on the received internal information.

If there is a plurality of printer drivers supportable by the image forming apparatus and if the printer driver error is not still solved by the firstly selected printer driver, the controller may select another one of the printer drivers as a subsequent printer driver.

The controller may give a priority to at least one of a manufacturer, a model name, and an emulation type in selecting a printer driver.

The foregoing and/or other aspects and utilities of the general inventive concept may also be achieved by providing an image forming apparatus which performs a printing operation in communication with a terminal device, the image forming apparatus including an emulation unit to output an error code if a printer driver error is detected, and a transmission unit to transmit the error code to the terminal device in order to install a new printer driver.

The transmission unit may transmit internal information including at least one of a manufacture, a model name, an emulation type of the image forming apparatus, and an emulation type supportable by the image forming apparatus, to the terminal device along with the error code.

The foregoing and/or other aspects and utilities of the general inventive concept may also be achieved by providing a method of solving a printing error of a terminal device, the method including determining if an error occurs due to a printer driver of an image forming apparatus, and if it is determined that an error occurs due to a printer driver, selecting a printer driver responding to the error from a pre-installed inbox driver based on information of a printer driver supportable by the image forming apparatus.

The method may further include installing the selected printer driver.

The method may further include displaying printer driver information of the inbox driver.

The method may further include providing a UI to question as to whether a printing operation is normally performed.

The inbox driver may provide the printer driver information which is classified by at least one of a manufacturer, a model name, and an emulation type.

The method may further include receiving an error code and pre-stored internal information from the image forming apparatus, and, if an error is recognized by an error code, the selecting operation may select a printer driver based on the received internal information.

If there is a plurality of printer drivers supportable by the image forming apparatus and if the printer driver error is not still solved by the firstly selected printer driver, the selecting operation may select another one of the printer drivers as a subsequent printer driver.

The selecting operation may give a priority to at least one of a manufacturer, a model name, and an emulation type in selecting a printer driver.

The foregoing and/or other aspects and utilities of the general inventive concept may also be achieved by providing a method of solving a printing error of an image forming apparatus which performs a printing operation in communication with a terminal device, the method including outputting an error code if a printer driver error occurs; and transmitting the error code to the terminal device in order to install a new printer driver.

The transmitting operation may transmit internal information including at least one of a manufacture, model name, an emulation type, and a supportable emulation to the terminal device along with the error code.

The foregoing and/or other aspects and utilities of the general inventive concept may also be achieved by providing an image forming system including an image forming apparatus to output an error code if a printer driver error is detected, and to transmit the error code, and a terminal device to provide information of one or more printer drivers in an inbox driver unit, and to select from the inbox driver unit one of the one or more printer drivers that responds to the error code of the image forming apparatus, based on information on a printer driver supported by the image forming apparatus.

The foregoing and/or other aspects and utilities of the general inventive concept may also be achieved by providing an image forming system including an image forming apparatus to perform a printing operation of a printer driver, and to generate error information and internal information when the printing operation is not completed, and a terminal device to control the image forming apparatus using a printer driver, and to select another printer driver according to the error information and the internal information on the image forming apparatus.

The foregoing and/or other aspects and utilities of the general inventive concept may also be achieved by providing an image forming system including an image forming apparatus to perform a printing operation of a printer driver, and to generate error information and internal information when the printing operation is not complete, to an external terminal device to replace the printer driver with another printer driver according to the error information and internal information.

The foregoing and/or other aspects and utilities of the general inventive concept may also be achieved by providing an image forming system including a terminal device to control an external image forming apparatus using a printer driver, to receive the error information and the internal information on the image forming apparatus, and to select another printer driver according to the error information and the internal information on the image forming apparatus.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like units throughout. The embodiments are described below in order to explain the present general inventive concept by referring to the figures.

Figure 1:
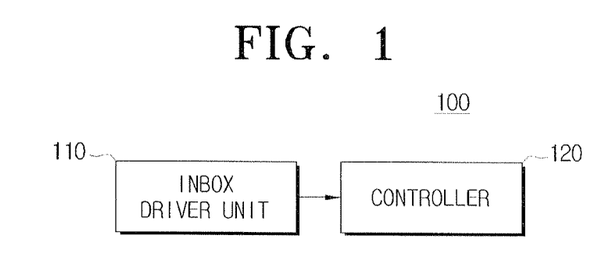
FIG. 1 is a block diagram illustrating a terminal device according to an exemplary embodiment of the present general inventive concept.

FIG. 1 is a block diagram illustrating a terminal device 100 usable with a printing system according to an exemplary embodiment of the present general inventive concept. Referring to FIG. 1, the terminal device 100 according to an exemplary embodiment of the present general inventive concept includes an inbox driver unit 110 and a controller 120.

The inbox driver unit 110 provides at least one piece of printer driver information. The inbox driver contains information about a list of printer drivers that are now being released or to be released by a manufacturer of an image forming apparatus. Such printer drivers are provided in advance at the time of releasing an operating system (OS) and are located in the OS. The inbox driver unit 110 may be embodied as a memory to store an inbox driver which contains the printer driver information. Also, the inbox driver unit 110 may provide the printer driver information classified by at least one of a manufacturer, a model name, and an emulation type.

If a printer driver error occurs, the controller 120 selects information about another printer driver that is supportable by the image forming apparatus from the inbox driver unit 110. The printer driver error may occur in the image forming apparatus, and the controller 120 receives the printer driver error from the image forming apparatus.

Figure 2:
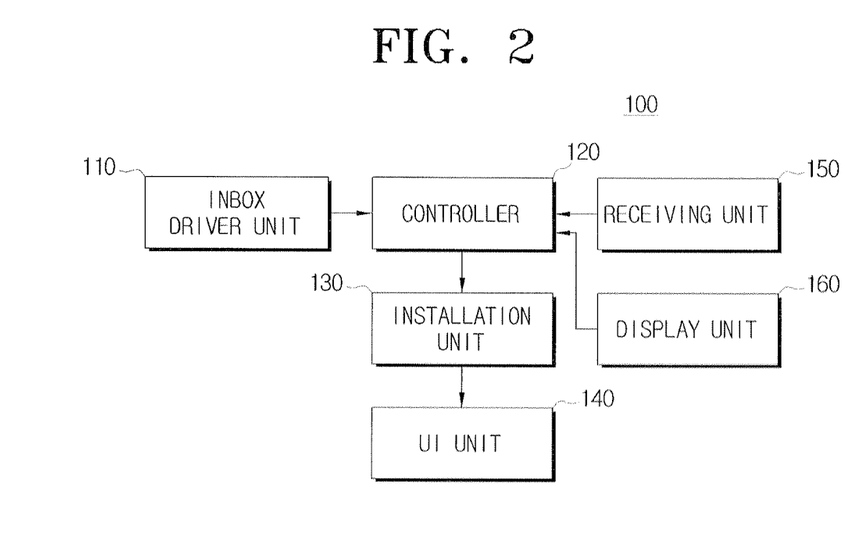
FIG. 2 is a block diagram illustrating the terminal device of FIG. 1 in detail.
Figure 3:
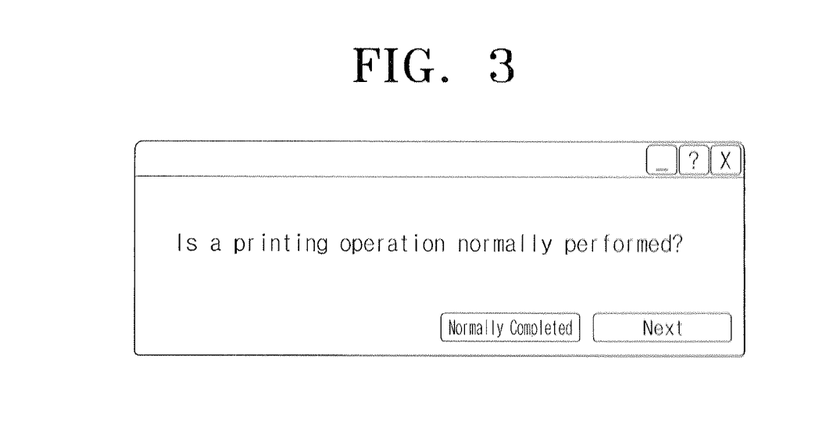
FIG. 3 is a view illustrating an example of a UI provided by a UI unit of the terminal device of FIG. 1.
Figure 4:
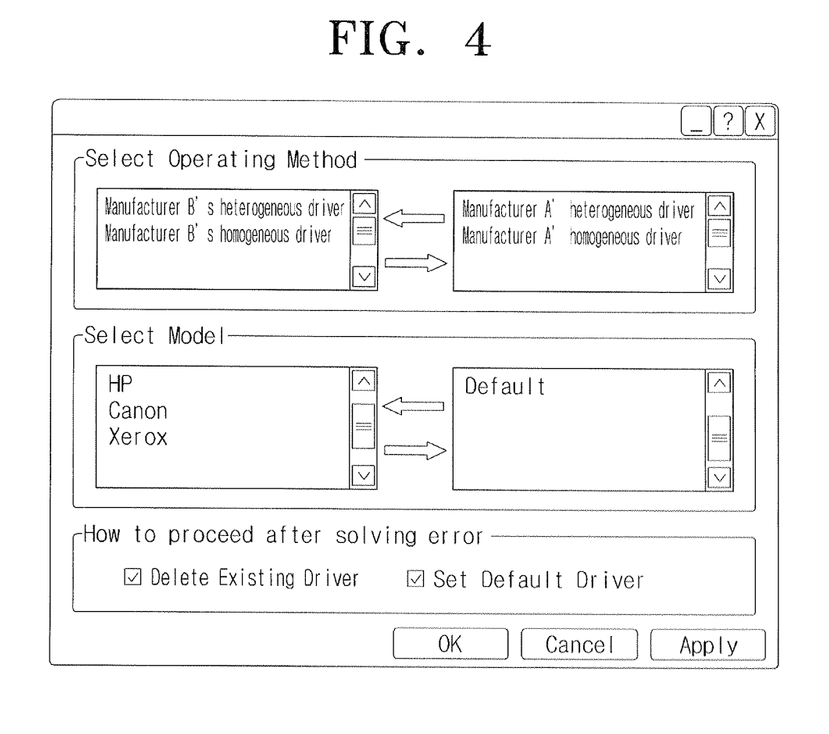
FIG. 4 is a view illustrating an example of information provided by a display unit of the terminal device of FIG. 1.

FIG. 2 is a block diagram illustrating the terminal device 100 of FIG. 1 in detail, FIG. 3 is a view illustrating a user interface (UI) provided by the terminal device 100 of FIGS. 1 and 2, and FIG. 4 is a view illustrating information provided by a display unit provided by the terminal device of FIG. 1.

Referring to FIG. 2, the terminal device 100 further includes an installation unit 130, a UI unit 140, a receiving unit 150, and a display unit 160 in addition to the inbox driver unit 110 and the controller 120.

The installation unit 130 installs a printer driver corresponding to the information provided by the controller 120. More specifically, the installation unit 130 may install a printer driver read from a storage medium including a program provided by a manufacturer, or download a printer driver received from an online server on the Internet and install the printer driver.

The UI unit 140 provides a UI to question as to whether a printing operation is normally performed by the installed printer driver. That is, if a new printer driver is installed, a user is required to check whether or not an error occurs due to the new printer driver with their naked eyes. For this, if a new printer driver is installed, the controller 120 of the terminal device 100 controls one or more printing units of one or more image forming apparatuses to automatically print a test page. Accordingly, the controller 120 allows the user to check the test page and questions as to whether to terminate the installing operation of the printer driver through the UI. An example of the UI is illustrated in FIG. 3.

If it is determined that a printing operation is normally performed, the user selects a button "Normally Completed" on the UI of FIG. 3 and performs a printing operation using the selected new printer driver. If a printing operation is not normally performed and an error still occurs, the user selects a button "Next" on the UI of FIG. 3 to proceed to a next stage to install another new printer driver. In this case, another printer driver stored in the inbox driver is selected and a question as to whether a normal printing operation is performed is asked again. The UI of FIG. 3 is merely an example and the UI and its menus can be modified in various forms It is possible that the controller 120 controls the printing unit of the image forming apparatus to print a test page when a new printer driver is installed, the printing unit may have an error occurring in the printing operation to print the test image, that is, the printing operation of the test image cannot be completed due to the error thereof, the controller 120 receives the error from the printing unit and to control the installation unit 130 to select and install another printer driver and to generate another test image to be printed in the printing unit of the image forming apparatus.

The receiving unit 150 receives an error code and internal information from the image forming apparatus. If an error is recognized by the error code, the controller 120 selects information about a printer driver that is supportable by the image forming apparatus from the inbox driver unit 110 based on the internal information of the image forming apparatus. The internal information is about a manufacture, a model name, a supportable emulation type, and a currently used printer driver. The error code will be described below.

If an error occurs, the display unit 160 displays an image or window corresponding to printer driver information provided by the inbox driver unit 110. The controller 120 selects at least one piece of printer driver information. Referring to FIG. 4, one of printer drivers is selected according to one of operating methods, and also a manufacturer of the selected printer is selected. Also, how to proceed after solving the error may be selected. For example, the previous driver may be deleted for purpose of increasing a capacity of a memory, or may not be deleted. Also, a selected driver is set as a default driver such that an error is solved.

The display image or window provided by the display unit 160 includes printer manufacturers A and B. Hereinafter, the term "homogeneous driver" represents that the drivers have the same printer language, and the term "heterogeneous driver" represents that the printer drivers have different printer languages from each other. For example, if a printer driver uses a printer control language (PCL), its homogeneous driver uses the PCL and its heterogeneous driver uses a PostScript (PS) or graphic device interface (GDI).

The manufacturer A's heterogeneous drivers and the manufacturer A's homogeneous drivers are selected from the manufacturer A's homogeneous drivers, the manufacturer A's heterogeneous drivers, the manufacturer B's homogeneous drivers, and the manufacturer B's heterogeneous drivers. Printer drivers may be added or deleted. It is also possible to designate a model of the selected driver type. In FIG. 4, a default is set, and other manufacturer may be added or deleted.

Also, the PCL, the PS, and the GDI are used as a printer language. However, this should not be considered as limiting. Various printer languages may be adopted and also they are variously adopted depending on their versions.

Figure 5:
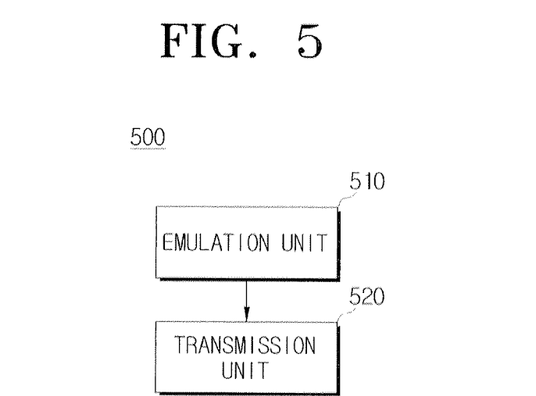
FIG. 5 is a block diagram illustrating an image forming apparatus according to an exemplary embodiment of the present general inventive concept.

FIG. 5 is a block diagram illustrating an image forming apparatus 500 usable in a printing system according to an exemplary embodiment of the present general inventive concept. Referring to FIGS. 1, 2, and 5, the image forming apparatus 500 includes an emulation unit 510 and a transmission unit 520. The emulation unit 510 detects a printer driver error and outputs an error code. The transmission unit 520 transmits the error code to an external terminal device, for example, the terminal device 100 of FIGS. 1 and 2, such that a new printer driver is installed. Also, the transmission unit 520 transmits to the terminal device 100 the internal information including at least one of a manufacturer, a model name, an emulation type of the image forming apparatus 500, and an emulation type supportable by the image forming apparatus 500, together with the error code.

The error code has a different error type for each emulation type, and a different error code is generated for each of the error types. For example, if an emulation type is a printer control language (PCL), there are error types 'Generic Error', 'Font Error', 'Data Source Errors', and 'Operator-Specific Errors'. Among these, the error type 'Generic Error' generates an error code such as 'IllegalOperatorSequence' and 'IllegalTag'. The error code 'IllegalOperatorSequence' is generated if an operator sequence is incorrect, and the error code 'IllegalTag' is generated if a tag format is not suitable for a current version. Error codes are generated in various forms depending on the emulation types, and representative error codes are described by way of an example.

Figure 6A:
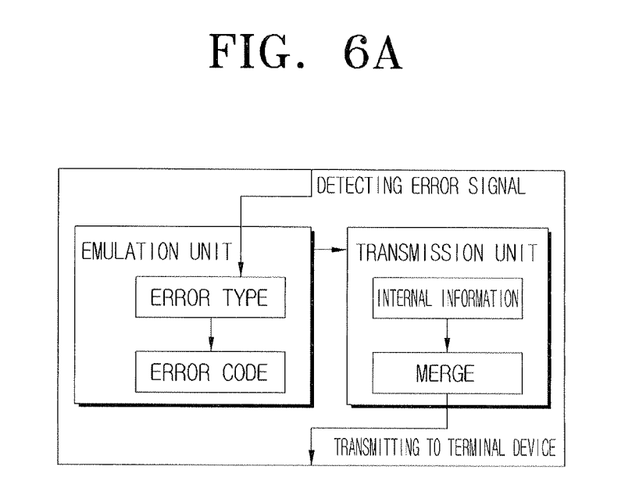
FIG. 6A is a diagram illustrating operations performed by the image forming apparatus of FIG. 5.

FIG. 6A is diagram illustrating operations performed in the image forming apparatus 500 of FIG. 5. More specifically, if an error signal is detected, the emulation unit 510 generates an error code which is different depending on the error types, as described above. The generated error code can be combined with the pre-stored internal information to be transmitted to the terminal device 100.

Figure 6B:
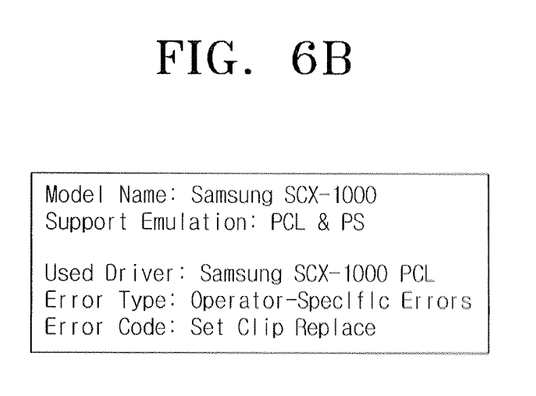
FIG. 6B is a view illustrating an example of information transmitted from the image forming apparatus to the terminal device according to the exemplary embodiment of the present general inventive concept.

FIG. 6B is a view illustrating an example of the information transmitted from the image forming apparatus 500 to the terminal device 100. Referring to FIG. 6B, a manufacture is Samsung, a model name is SCX-1000, and PCL and PS are supportable. Currently, Samsung SCX-1000 PCL type printer driver is used, and an error type is 'Operator-Specific Errors' and an error code is 'Set Clip Replace'.

Figure 7:
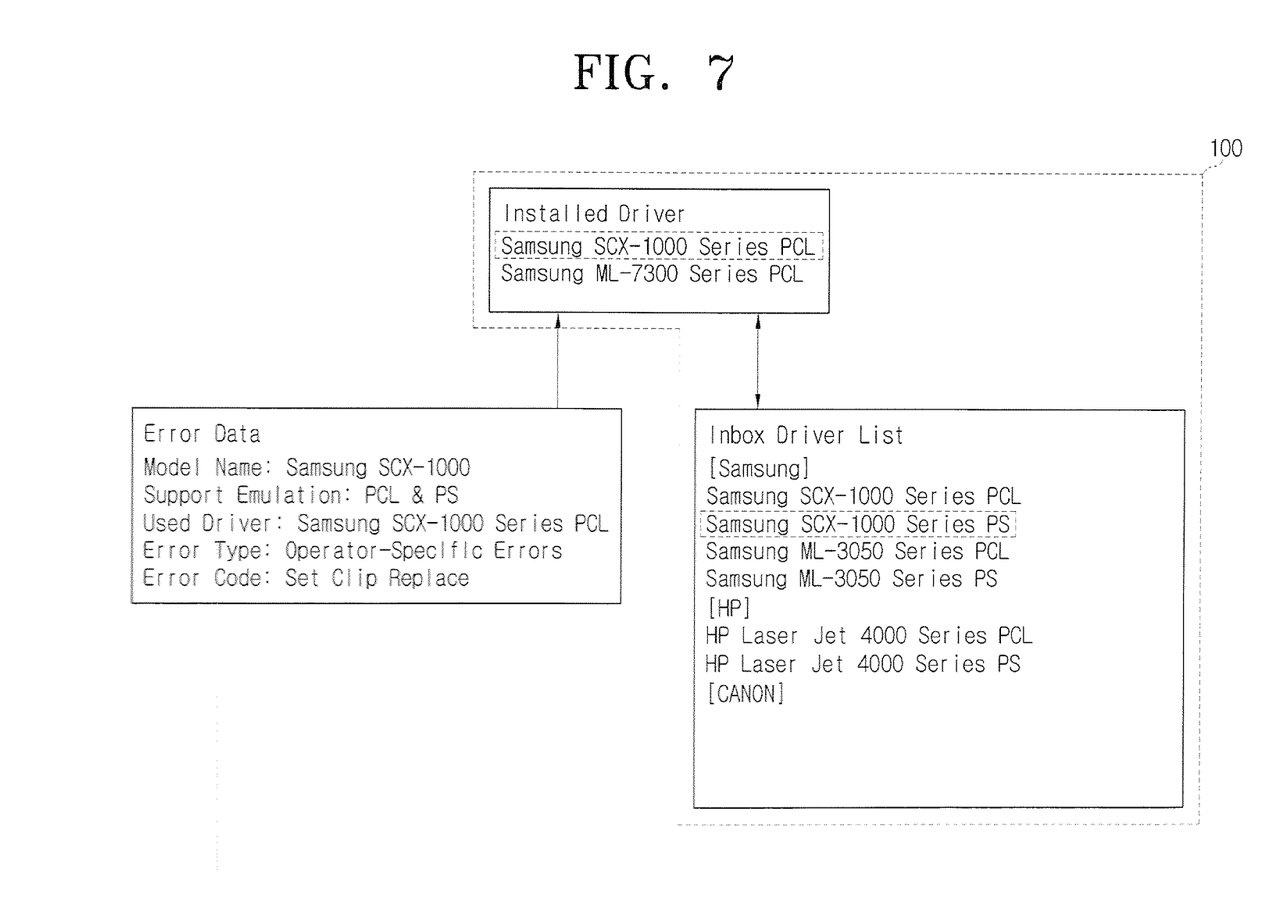
FIG. 7 is a diagram illustrating operations performed between the terminal device and the image forming apparatus according to the exemplary embodiment of the present general inventive concept.

FIG. 7 is a view illustrating operations performed between a terminal device and an image forming apparatus according to the exemplary embodiment of the present general inventive concept. As described with reference to FIG. 6B, an error code is transmitted to the terminal device 100 along with pre-stored internal information as error data. The terminal device 100 receives the error or data including the error code and the pre-stored internal information through the receiving unit 150. The inbox driver unit 110 provides information about the printer drivers, and then the controller 120 selects information about a printer driver that is supportable by the image forming apparatus 500 from the inbox driver unit 110.

More specifically, in FIG. 7, a PCL and a PS are described as a supportable emulation type. Currently, the printer driver 'Samsung SCX-1000 Series PCL' is used and also the printer driver 'Samsung ML-7300 Series PCL' has been installed. The inbox driver unit 110 provides information about printer drivers. For example, in FIG. 7, the printer driver 'Samsung SCX-1000 Series PS', which is a supportable emulation type and also is the manufacturer A's heterogeneous driver, is selected from the inbox driver.

If there is a plurality of printer driver supportable by the image forming apparatus and if a firstly selected printer driver does not solve the printer driver error by repeating the printing operation, the controller 120 selects a subsequent printer driver and tries to solve the printer driver error. If there is a plurality of printer drivers supportable by the image forming apparatus, the printer drivers are selected in order of installation, that is, in order of registration. Alternatively, in selecting the printer driver, a priority is given to an emulation type or a specific manufacturer. Also, a user may directly select a printer driver based on the information provided by the inbox driver unit 110. These ways of selecting the printer drivers can be variously modified. Here, installation or the registration of the printer drive may correspond to installation or registration data to install or register the printer driver in the terminal device.

Figure 8:
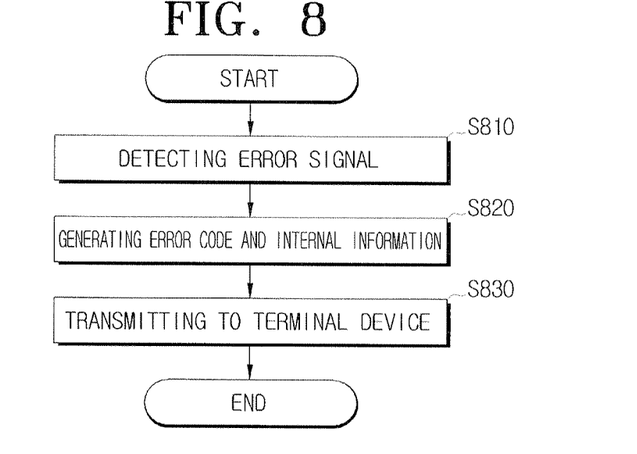
FIG. 8 is a flowchart illustrating a method for solving a printing error of an image forming apparatus according to an exemplary embodiment of the present general inventive concept.

FIG. 8 is a flowchart illustrating a method of solving a printing error of an image forming apparatus of a printing system according to an exemplary embodiment of the present general inventive concept. Referring to FIG. 8, an error signal is detected in the image forming apparatus at operation S810. A different error code is generated depending on an emulation type and an error type through the detected error signal, and the generated error code and pre-stored internal information are transmitted to the terminal device 100 at operations S820 and S830.

Figure 9:
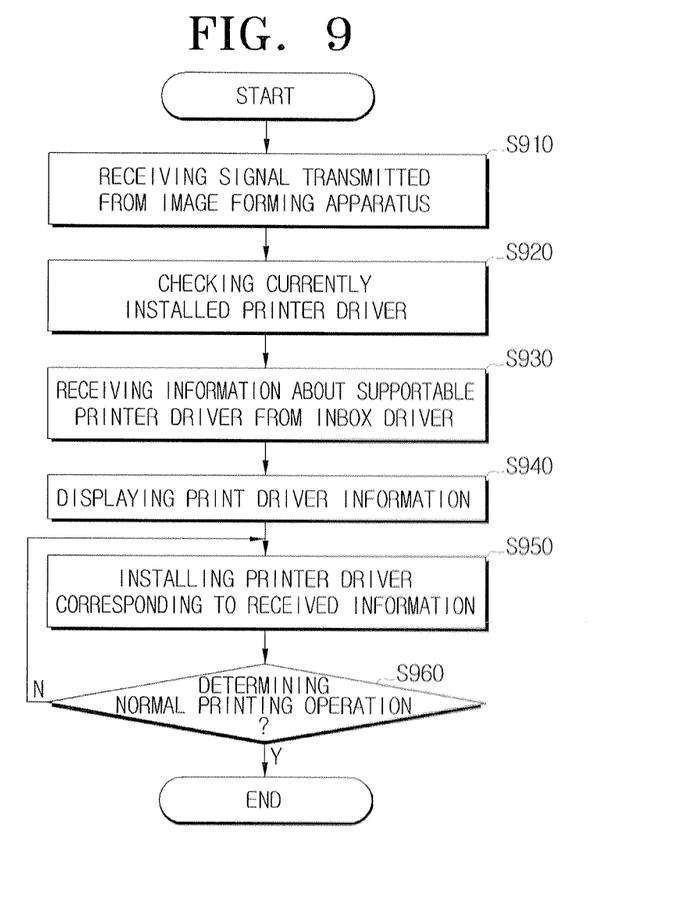
FIG. 9 is a flowchart illustrating a method for solving a printing error of a terminal device according to an exemplary embodiment of the present general inventive concept.

FIG. 9 is a flowchart illustrating a method of solving a printing error of a terminal device of a printing system according to an exemplary embodiment of the present general inventive concept. Referring to FIG. 9, the terminal device receives a signal from the image forming apparatus at operation S910. The terminal device checks a currently installed printer driver at operation S920, receives information about a supportable printer driver from the inbox driver at operation S930, and displays the printer driver information provided from the inbox driver at operation S940. A printer driver corresponding to the received information is installed at operation S950, and then, if it is determined that a printing operation is normally performed at operation S960, the image forming apparatus 500 performs a printing operation using the newly installed printer driver. If it is not determined that a printing operation is normally performed at operation S960, a next selectable printer driver is installed, and it is determined whether a normal printing operation is performed.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

According to the present general inventive concept, if a printer driver error occurs in using a specific printer language or if a printer driver unsuitable to a user's printer is installed, a compatible printer driver is searched through the inbox driver and installed. Accordingly, a user's convenience can be improved. Accordingly, since a compatible printer driver is searched and installed through an inbox driver to solve a printing error, a user's convenience is improved Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A terminal device usable with an image forming system, comprising:
    an inbox driver unit to store a plurality of printer drivers and to provide printer driver information of the plurality of printer drivers including at least one of a manufacturer, a model name, and an emulation type;
    a receiving unit to receive an error code generated upon detection of an error corresponding to a currently used printer driver and pre-stored internal information of the image forming apparatus from the image forming apparatus;
    a controller to select one printer driver from among the plurality of printer drivers, wherein at least one of the manufacturer, the model name and the emulation type included in the printer driver information of the selected printer driver is different from a manufacturer and a model name included in the received internal information and an emulation type determined by a form of the received error code; and
    an installation unit to install the printer driver selected by the controller, automatically.

2. The terminal device of claim 1, further comprising:
    a display unit to display the printer driver information provided from the inbox driver unit.

3. The terminal device of claim 2, further comprising:
    a UI unit to provide a UI to question whether a printing operation is normally performed by the installed printer driver.

4. The terminal device of claim 1, wherein, if there is a plurality of printer drivers supportable by the image forming apparatus and if the detected error corresponding to the currently used printer driver is not solved by a previously selected printer driver, the controller selects a subsequent printer driver.

5. The terminal device of claim 4, wherein the controller gives a priority to at least one of a manufacturer, a model name, and an emulation type in selecting a printer driver.

6. The terminal device of claim 1, wherein the plurality of print drivers are located in an operating system (OS) of the terminal device.

7. The terminal device of claim 1, wherein, if a new printer driver is installed, the controller controls the image forming apparatus to automatically print a test page to show whether the new printer driver works.

8. The terminal device of claim 1, wherein, if the plurality of print drivers include a plurality of print drivers supportable by the image forming apparatus, the controller selects one of the print drivers supportable by the image forming apparatus based on a priority.

9. The terminal device of claim 8, wherein the priority is based on at least one of an order of registration of the print drivers, an emulation type and a manufacturer.

10. An image forming apparatus which performs a printing operation in communication with a terminal device, the image forming apparatus comprising:
an emulation unit to output an error code if an error corresponding to a currently used printer driver is detected; and
a transmission unit to transmit the output error code and pre-stored internal information of the image forming apparatus to the terminal device in order to install a new printer driver automatically, the internal information including at least one of a manufacturer, a model name, an emulation type of the image forming apparatus, and an emulation type supportable by the image forming apparatus,
wherein the new printer driver is selected from among a plurality of printer drivers stored in the terminal device, and
wherein at least one of the manufacturer, the model name and the emulation type included in printer driver information of the new printer driver is different from a manufacturer and a model name included in the internal information and an emulation type determined by a form of the output error code.

11. A method of solving a printing error of a terminal device in an image forming system, the method comprising:
receiving an error code generated upon detection of an error corresponding to a currently used printer driver in the image forming system and pre-stored internal information of an image forming apparatus from the image forming apparatus;
determining if the detected error occurs in the image forming apparatus due to the printer driver of the image forming apparatus by using the error code;
if it is determined that the detected error occurs due to the printer driver, selecting a printer driver from among a plurality of printer drivers stored in an inbox driver, wherein the selected printer driver is different in at least one of a manufacturer, a model name and an emulation type included in printer driver information of the selected printer driver from a manufacturer and a model name included in the received internal information and an emulation type determined by a form of the received error code; and
installing the selected printer driver automatically.

12. The method of claim 11, further comprising:
displaying printer driver information of the plurality of printer drivers of the inbox driver.

13. The method of claim 11, further comprising:
providing a UI to question whether a printing operation is normally performed.

14. The method of claim 11, wherein the inbox driver provides the printer driver information which is classified by at least one of the manufacturer, the model name, and the emulation type of the selected printer driver.

15. The method of claim 11,
wherein, if an error is recognized by reading the error code, the selecting operation selects a printer driver based on the received internal information.

16. The method of claim 11, wherein, if there is a plurality of printer drivers supportable by the image forming apparatus and if the printer driver error is not solved by a previously selected printer driver, the selecting comprises selecting a subsequent printer driver.

17. The method of claim 16, wherein the selecting operation gives a priority to at least one of a manufacturer, a model name, and an emulation type in selecting a printer driver.

18. A method of solving a printing error of an image forming apparatus which performs a printing operation in communication with a terminal device having an inbox driver unit which stores a plurality of printer drivers, the method comprising:
outputting an error code if a printer driver error occurs in a currently used printer driver; and
transmitting the output error code and pre-stored internal information corresponding to the currently used printer driver to the terminal device in order to install a new printer driver in the inbox driver unit automatically,
wherein the new printer driver is selected from among the plurality of printer drivers stored in the inbox driver unit, and
wherein at least one of a manufacturer, a model name and an emulation type included in printer driver information of the new printer driver is different from a manufacturer and a model name included in the internal information and an emulation type determined by a form of the output error code.

19. The method of claim 18, wherein the internal information includes at least one of a manufacture, model name, an emulation type, and a supportable emulation.

* * * * *